United States Patent
Lewin et al.

(10) Patent No.: US 9,806,456 B2
(45) Date of Patent: Oct. 31, 2017

(54) CONNECTOR PART OF A CONNECTOR UNIT

(71) Applicant: Siemens Aktiengesellschaft, Munich (DE)

(72) Inventors: Richard Lewin, Ulverston (GB); Christopher Plant, Lancaster (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/100,411

(22) PCT Filed: Dec. 2, 2014

(86) PCT No.: PCT/EP2014/076174
§ 371 (c)(1),
(2) Date: May 31, 2016

(87) PCT Pub. No.: WO2015/090927
PCT Pub. Date: Jun. 25, 2015

(65) Prior Publication Data
US 2016/0308300 A1    Oct. 20, 2016

(30) Foreign Application Priority Data

Dec. 17, 2013  (EP) ...................... 13197800

(51) Int. Cl.
| | | |
|---|---|---|
| H01R 4/58 | (2006.01) |
| H01R 13/523 | (2006.01) |
| H01R 13/53 | (2006.01) |
| H02G 15/064 | (2006.01) |
| H02G 15/103 | (2006.01) |
| H01R 13/52 | (2006.01) |
| H01R 13/66 | (2006.01) |

(52) U.S. Cl.
CPC ....... *H01R 13/523* (2013.01); *H01R 13/5219* (2013.01); *H01R 13/53* (2013.01);
(Continued)

(58) Field of Classification Search
CPC ............... H02G 15/064; H02G 15/103; H01R 13/6608; H01R 13/53; H01R 13/5219; H01R 13/523
(Continued)

(56) References Cited

U.S. PATENT DOCUMENTS 3,571,783 A * 3/1971 Lusk ...................... H01R 31/00
                                                             174/21 R
5,352,126 A * 10/1994 Kuboshima .......... H02G 15/068
                                                             439/587
(Continued)

FOREIGN PATENT DOCUMENTS

DE      3027096 A1    2/1982
DE      4310125 A1   10/1994
(Continued)

*Primary Examiner* — Abdullah Riyami
*Assistant Examiner* — Nelson R Burgos-Guntin
(74) *Attorney, Agent, or Firm* — Beusse Wolter Sanks & Maire

(57) ABSTRACT

A connector part of a connector unit with a male part and a female part, has at least one electrically conductive layer with at least one end region being electrically stressed after a mating process of the male part and the female part. To minimize electrical stress concentrations, the connector part has at least one stress control device for reducing electrical stress at the at least one end region.

20 Claims, 7 Drawing Sheets

(52) U.S. Cl.
CPC ....... *H01R 13/6608* (2013.01); *H02G 15/064* (2013.01); *H02G 15/103* (2013.01)

(58) Field of Classification Search
USPC .............................. 439/88, 181, 921; 174/32
See application file for complete search history.

(56) References Cited

U.S. PATENT DOCUMENTS

| | | | |
|---|---|---|---|
| 7,794,254 B2 * | 9/2010 | Marklove ............ | H01R 13/521 |
| | | | 439/271 |
| 2002/0016097 A1 * | 2/2002 | Parkinson ............ | H01R 13/523 |
| | | | 439/89 |
| 2008/0207022 A1 * | 8/2008 | Hughes .................. | H01R 13/53 |
| | | | 439/89 |
| 2014/0076624 A1 * | 3/2014 | Bohlin .................. | H02G 15/046 |
| | | | 174/40 R |
| 2016/0126641 A1 * | 5/2016 | Lewin ...................... | H01R 4/20 |
| | | | 439/86 |

FOREIGN PATENT DOCUMENTS

| | | |
|---|---|---|
| EP | 0692153 A1 | 1/1996 |
| WO | 2004038735 A1 | 5/2004 |
| WO | 2007096760 A1 | 8/2007 |
| WO | 2008113026 A1 | 9/2008 |

* cited by examiner

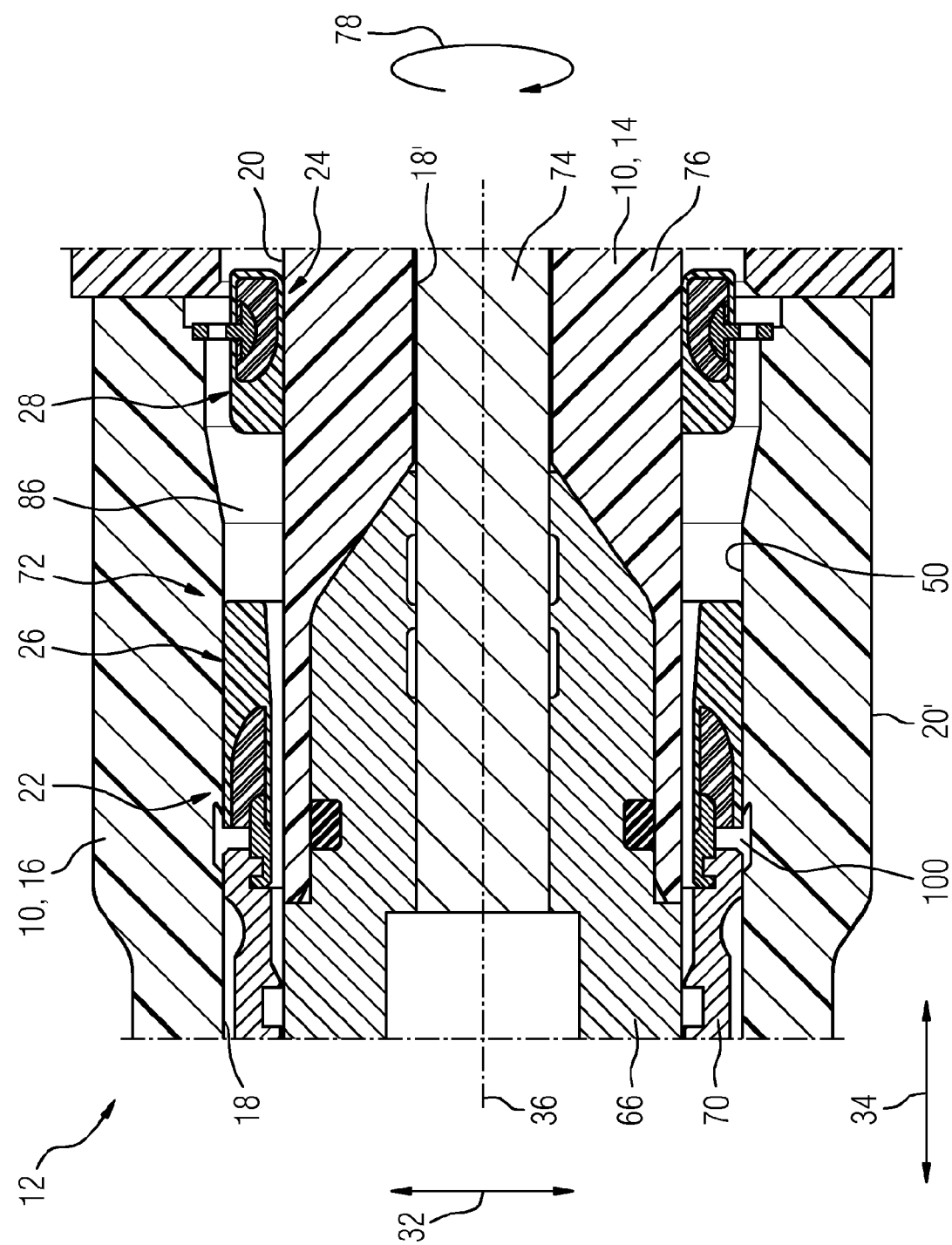

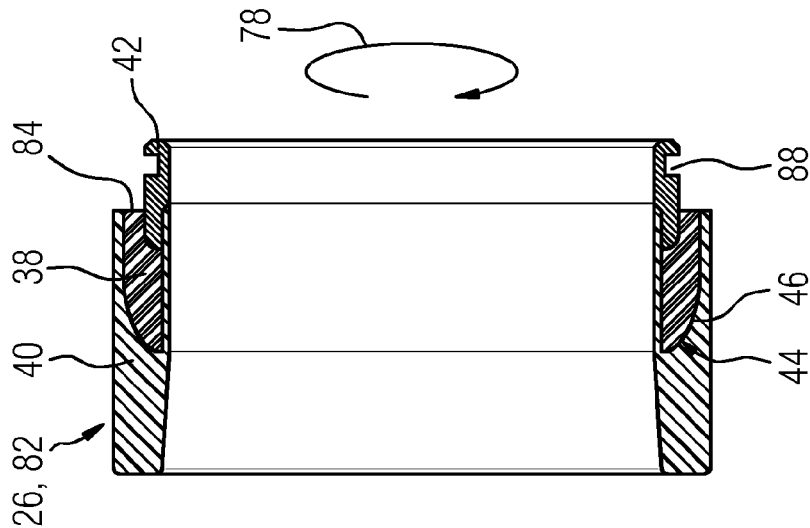
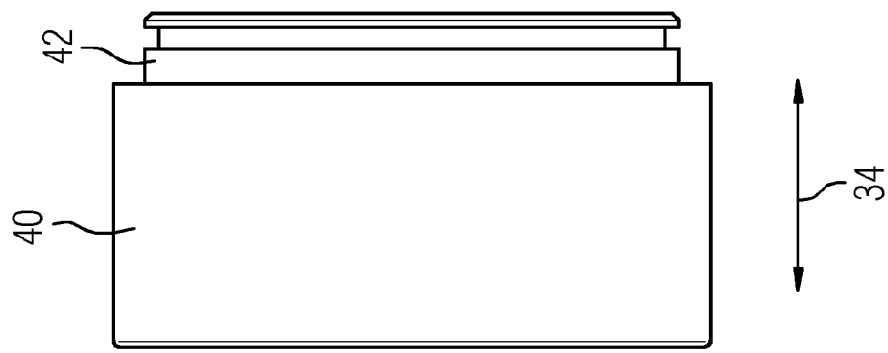
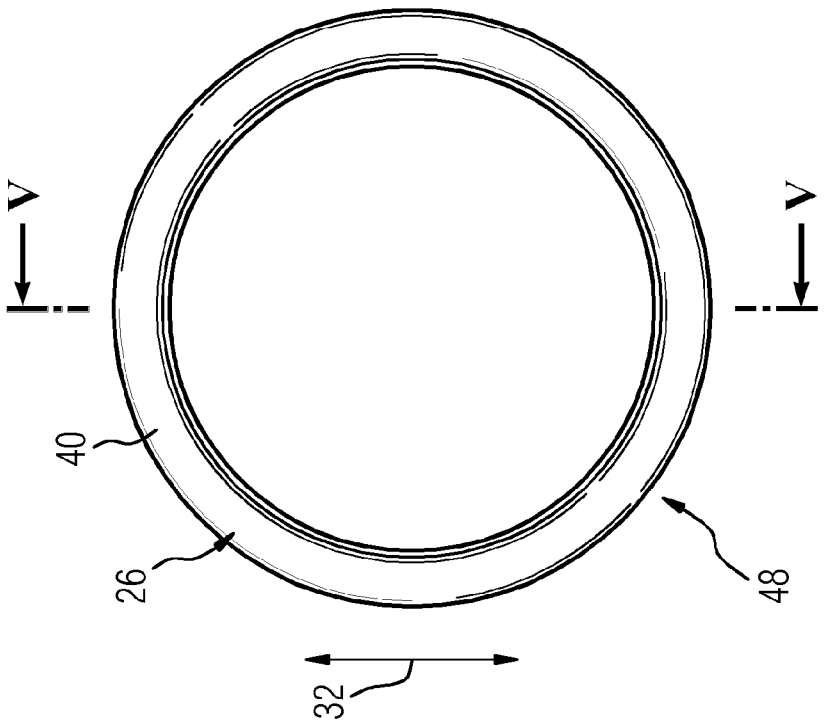

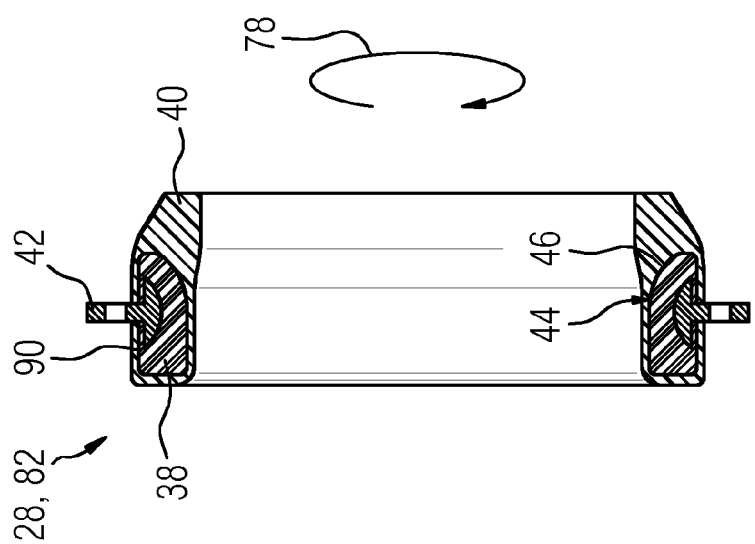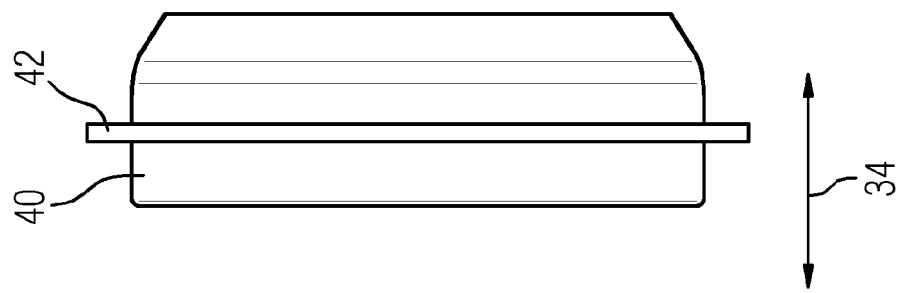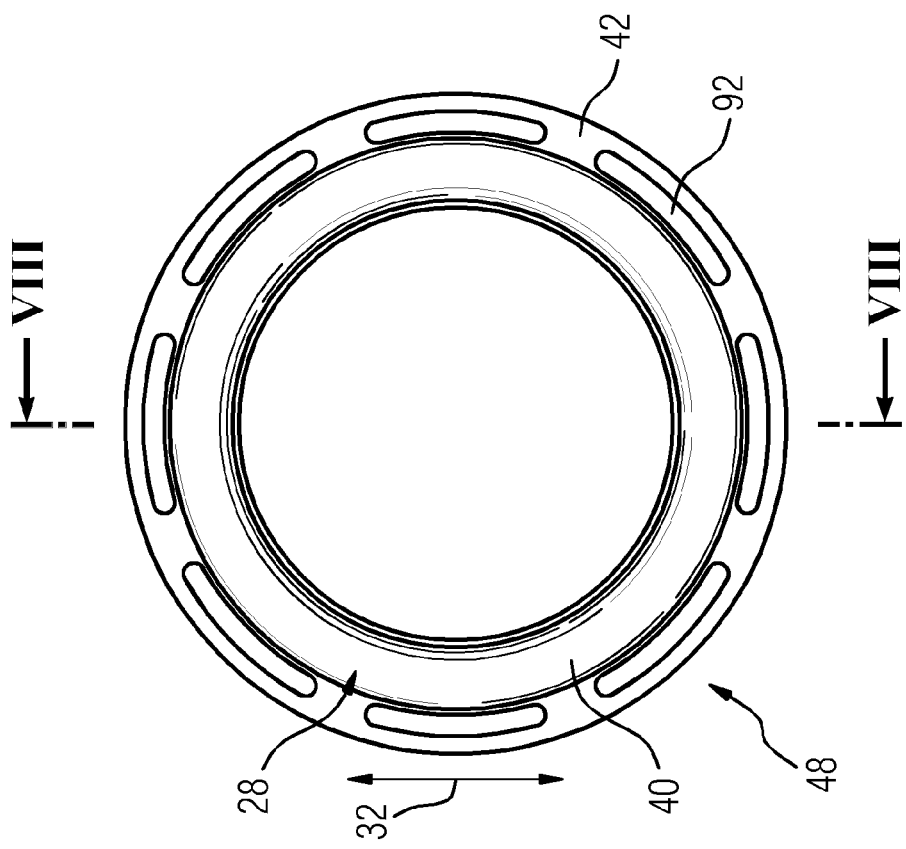

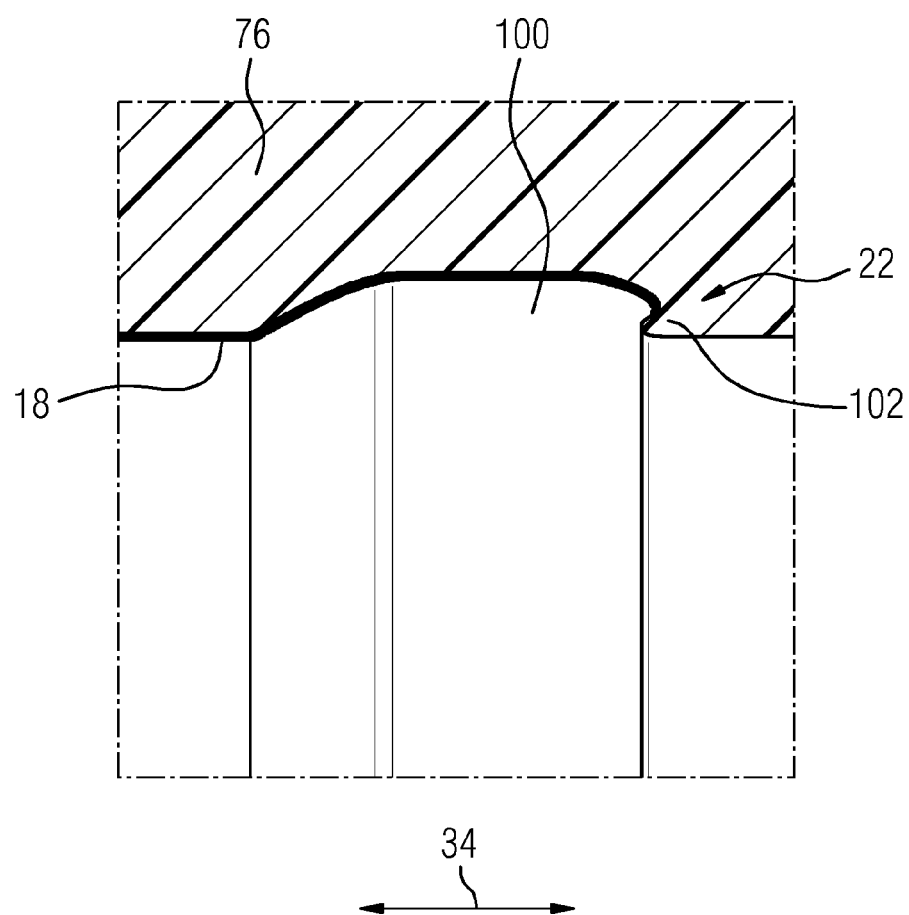

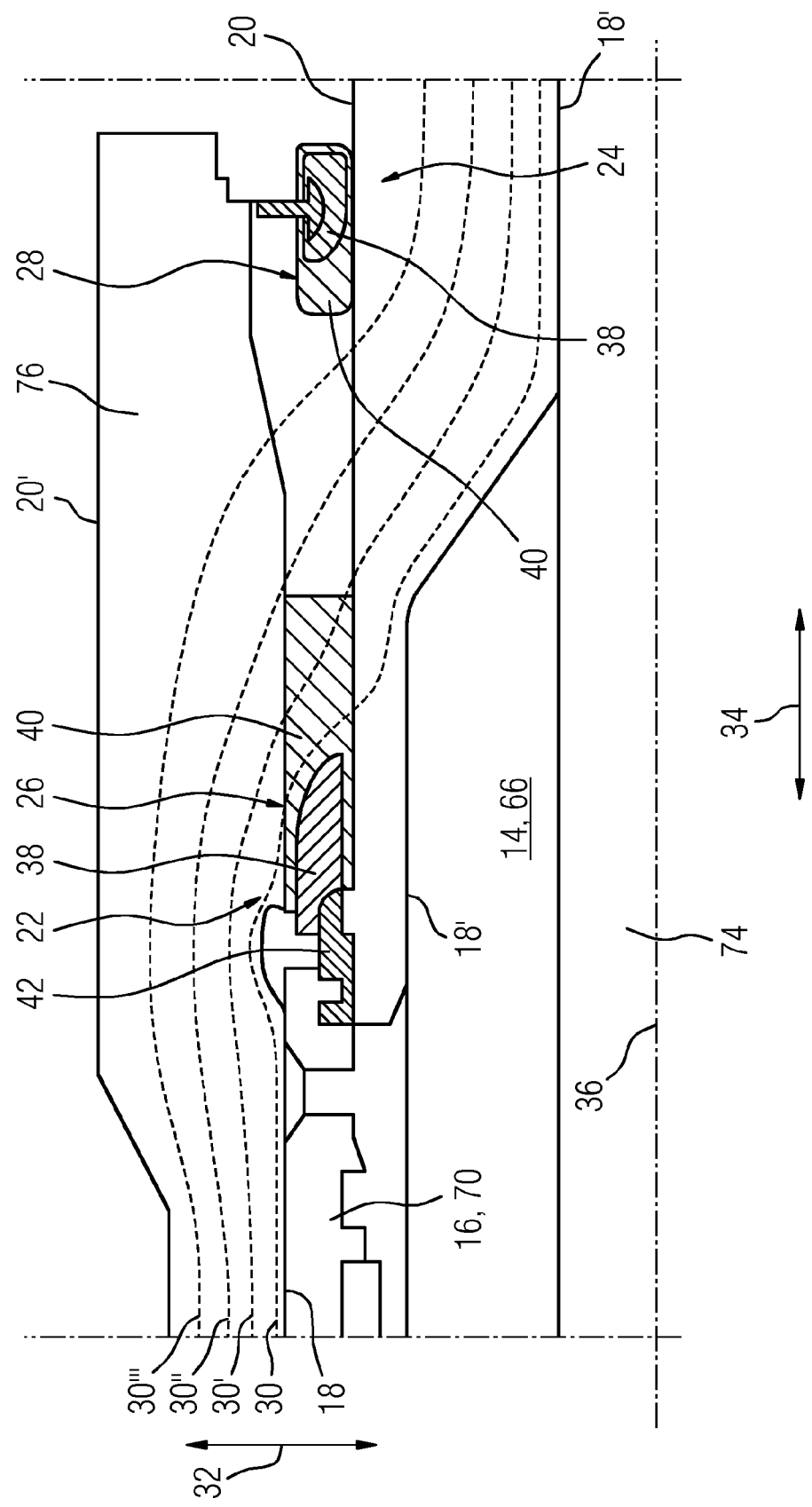

CONNECTOR PART OF A CONNECTOR UNIT

CROSS REFERENCE TO RELATED APPLICATIONS

This application is the U.S National Stage of International Application No. PCT/EP2014/076174 filed Dec. 2, 2014, and claims the benefit thereof. The International Application claims the benefit of European Application No. EP13197800 filed Dec. 17, 2013. All of the applications are incorporated by reference herein in their entirety.

FIELD OF INVENTION

The present invention relates to a connector part of a connector unit with a male part and a female part, comprising at least one electrically conductive layer comprising at least one end region being electrically stressed after the male part and the female part have been mated.

ART BACKGROUND

In the near future an increasing demands for communication over wide distances, especially for example between continents will be needed. Hence, infrastructures, like sea cables and connectors linking sea cables and modules, e.g. subsea modules, like transformers, pumps etc., that are located and operated error proof subsea will be essential. It is known to use electrically conductive plating as a means of controlling the electrical stress within a connector and allows the size of the connector to be reduced. The plating does however create localised regions of high electrical stress wherever the plating ends which cause stress concentrations and can lead to partial discharge at higher AC voltages between a conductor and an insulator in typical connectors and penetrators. This can even result in failure of the connector or penetrator at an unacceptably low voltage.

In current connectors components of a sufficiently large size relative to the operating voltage are used to avoid unacceptably high stress points in critical regions. However, for a high voltage connector design, following this approach would lead to relatively large, heavy and expensive components.

It is a first objective of the present invention to provide a connector part for a connector unit that has electrically unstressed interfaces and that is small in size as well as light in weight and can be manufactured with low costs.

This objective may be solved by a connector part according to the subject-matter of the independent claim.

SUMMARY OF THE INVENTION

According to a first aspect of the present invention, a connector part of a connector unit, especially for a use in a subsea application, is provided, wherein the connector unit comprises a male part and a female part, and wherein the connector part comprises at least one electrically conductive layer or plating comprising at least one end region being electrically stressed after a mating process of the male part and the female part.

It is proposed, that the connector part is characterised by at least a stress control device for reducing electrical stress at the at least one end region.

Due to the inventive matter, electrical stress can be efficiently controlled and electrical stress concentrations may be minimised in respect to systems without a stress control device. Hence, a risk for partial discharge is reduced and a possibility that the connector may fail at an unacceptably low voltage is avoided. This is especially so because the end region is arranged, when the connector is mated, at (a) moving part(s) and in close proximity to oil flow and electrically stressed insulation oil, which is intrinsically weaker electrically than solid insulators. Consequently, a reliable connector part is provided that is less insusceptible to errors, in comparison to state of the art systems, and can be successfully used in high voltage applications.

Moreover, by using the inventive stress control device, pieces of the connector part, like an insulation, may be placed under greater electrical stress in comparison with state of the art systems. It also has advantages in terms of preventing the stress diverging into places where it may have detrimental effects. Thus, electrical stresses are easily controlled in most regions during the design of current carrying components. Hence, a system with less electrical issues, compared with state of the art systems, may advantageously be provided. In addition, this inventive design will reduce the size and weight of the connector unit as well as the costs of the pieces and for an assembling.

Even if the terms "electrically conductive layer, end region, stress control device, conductive component, insulative moulding, fastening structure, component, component assembly, contour, taper, material, coating, microvaristor, surface" (see also below) are used in the singular or in a specific numeral form in the claims and the specification the scope of the patent (application) should not be restricted to the singular or the specific numeral form. It should also lie in the scope of the invention to have more than one or a plurality of the above mentioned structure(s).

A connector unit is intended to mean a unit which physically connects at least two parts, like two cables, such as sub-sea cables, or a cable with a-subsea-module (e.g. a transformer, a pump etc.) or a busbar inside of the module or two modules, respectively. Thus, it may be a subsea connector unit. The connector unit may be used in any harsh environment and may be embodied as an electrical connector and/or penetrator or as a wet mateable connector/penetrator. Moreover, it may be employed in a high voltage application.

Such a connector unit comprises at least a conductor part that helps to establish an electrical connection in a mated position of two connected parts, like two cables or a cable with a module. This conductor part may be a conductor pin, receptacle pin or male part of a connector or of a penetrator or a socket contact of a female part, plug or socket or connector body of a connector for contacting a conductor pin of a male part. Thus, the inventive connector part is embodied as the male part and/or as the female part and especially, is a conductor part of the connector unit.

Furthermore, the female socket is intended to mean a part of the connector unit with an opening, recess or bore to receive another part of the connector unit, like the conductor pin or parts thereof. Moreover, in case of an embodiment of the connector unit as comprising a penetrator the conductor pin is permanently connected to a cable or a module via a housing. Thus, the conductor pin is intended to mean a part of the unit with a pin, extension or the like to engage or being inserted in the opening of the female socket or the cable or the module. The conductor pin and its corresponding part (female socket, cable or module) are intended to establish an electrical connection either in case of mating of the male and female parts or a permanent connection of the conductor pin with the cable or module. The female and male parts or the module each may be encased in a casing or an external of a cable.

Moreover, an electrically conductive layer, also referred in the following text as conductive layer or plating, may be any layer feasible for a person skilled in the art, like a metal layer, a ceramic layer or a conductive plastic layer. Experimentally, it has been shown that the following ranges were beneficial for the conductive properties of the conductive layer. In case of a metal layer it may have a thickness between 1 µm and 40 µm, advantageously between 5 µm and 35 µm and most advantageously between 10 µm and 30 µm. Further, in case of a conductive plastic layer it may have a thickness between 1 mm and 20 mm, advantageously between 1.5 mm and 10 mm and most advantageously between 2 mm and 5 mm. Moreover, in case of a ceramic layer it may have a thickness between 1 µm and 500 µm, advantageously between 50 µm and 200 µm, and most advantageously between 80 µm and 120 µm and advantageously of about 100 µm.

Furthermore, a metal layer may for example be out of copper, a copper alloy, aluminium, nickel-cobalt ferrous alloy (e.g. Kovar®), molybdenum, titanium and (phosphorous) nickel. Moreover, the metal layer may be arranged on a base layer, e.g. high phosphorous nickel on top of a copper base layer. Thus, the metal layer may comprise more than one layer. The metal layer may comprise titanium or (phosphorous) nickel the latter disposed on a base layer out of copper. The conductive plastic layer may for example be out of an engineering plastic or a material out of the PAEK family or Epoxy family or polyamide family, advantageously, polyether ether ketone (PEEK). The ceramic layer may for example be out of $Bi_2O_3$ or $Cr_2O_3$. Also a titanium ceramic, like for example TiN and TiO, could be used and would probably be the best ceramics to use.

An end region of the conductive layer is intended to mean a region of the conductive layer where the conductive property of the layer is terminated and/or the end region coincides with a physical end of the conductive layer. Moreover, a stress control device is intended to mean any device, like a component, a component assembly or a modification of a state of the art component, like a reshaping, a different arrangement, a material substitution or a coating, feasible for a person skilled in the art that has the ability to change or reduce an occurrence of electrical stress. Thus, the stress control device is an electrical stress control device.

Advantageously, the stress control device is arranged at least at one surface of the connector part and most advantageously, at a conductive layer. The stress control device may have a physically overlapping contact with the surface or at least an electrically connection, directly or indirectly e.g. via a mediator part, with the surface. The wording "after a mating process" should especially understood as during operation of the connector unit.

Furthermore, it is provided that the electrically conductive layer is a first electrically conductive layer that is connected to a high voltage part of the connector unit. Advantageously, the electrically conductive layer is at least a second electrically conductive layer that is connected to a zero voltage part (0V) of the connector unit. These two conductive layers are radially separated by an insulator or several insulators. The term "connected" should be understood as directly or indirectly connected. The high voltage part and the zero voltage part of the connector unit may be a high voltage part and a 0V part of the male part or a high voltage part and 0V part of the female part or both. This is so, because before the male pin and the female socket are mated there are two high voltage and two zero voltage parts, one in the male pin and one in the female socket. However, once the male pin and the female socket are mated the two high voltage systems are joined and the zero voltage systems (two earth systems) are joined so in the mated state there is just one continuous high voltage region and one continuous 0V region shared between the male pin and the female socket.

The connector part may include a current carrying component and an insulating sleeve around the current carrying component. At least a part of the first electrically conductive layer may be provided on the inside of the insulating sleeve, in particular the layer connected to the high voltage part. At least a part of the second electrically conductive layer may be provided on the outside of the insulating sleeve, in particular the layer connected to earth or to the zero voltage part.

During operation of the connector unit in its mated position, a voltage increases through the various insulation media between the high voltage and 0V regions. In case of a state of the art connector unit without a stress control device the voltage profiles "bend" strongly around the regions where the conductive layer ends. This is because the end(s) of the conductive layer(s) is/are sharp and very sudden so there is no control of how the voltage profile varies. The electrical stress on a medium is given by the rate of change of the voltage field. Therefore, there will be high electrical stresses in any region where the voltage contours are close together or where they bend sharply.

To overcome this phenomenon, the stress control device is embodied in such a way, that regions with different potentials being established between the first electrically conductive layer and the second electrically conductive layer in a mated position of the male part and the female part are distributed homogeneously basically in radial direction and in axial direction in respect of an axis of the connector unit. Consequently, the occurrence of electrical stress concentrations can be avoided. The term "distributed homogeneously basically in radial and in axial direction" should be understood as, that radial thicknesses of the regions with different potentials are basically the same and that the profiles of the regions with different potentials diverge less than 60° from the direction of the axis of the connector unit. In the scope of the radial thicknesses as "basically the same" should also lie a divergence of the radial thicknesses of about 15%.

It is further provided, that the stress control device is arranged at least in a mated position of the male part and the female part with physical, specifically electrical, contact to the end region of the conductive layer. Hence, electrical stress can be constructively easy minimised.

In another embodiment the stress control device comprises at least one conductive component. Thus, a magnitude of the electrical stress can be limited easily. The conductive component can have any conductive material suitable for a person skilled in the art. Advantageously, the conductive component has a material selected out of the group comprising of a metal, a polymer, an elastomer, a rubber and advantageously, a silicone rubber. This provides an easy manufacturing process, a flexible assembling as well as satisfying properties of the component. Advantageously, the conductive component is an elastomeric component so that it may be shaped in situ in its desired shape broadening its field of application.

Advantageously, the conductive component has a specifically shaped contour to smooth and/or to balance an electrical stress effect and/or a high electrical stress occurrence, respectively, at a surface gradient of at least a component and/or a component assembly of the connector unit that is arranged at the end region at least in a mated position of the male part and the female part. Hence, occurring electrical stress can be antagonised with a simple means. A surface gradient should be understood as a change in a radial and/or axial extension of a component or between at least two components of the connector unit, like a sharp bend, a stepped contour or a taper.

Advantageously, the conductive component has a specifically shaped contour that has a tapered contour, especially in the form of a rounded cone. Thus, a change in the contour is especially smooth, which allows the field to diverge smoothly, thus reducing the stresses. Advantageously, the, specifically gradual and/or conical, taper extends away from the end region of the electrically conductive layer. In other words, an opening of the taper or an enlargement of an opening of the taper extends away from the end region of the conductive layer/plating. This results in an orientation of the conductive component that is selected to compensate the change in the voltage field after the conductive layer.

According to another embodiment of the invention, the stress control device comprises at least one insulative moulding resulting in a good insulation of the stress control device. In another embodiment of the invention the insulative moulding is moulded basically around the conductive component. This results in an efficient separation of the conductive component from detrimental effects. Advantageously, the insulative moulding separates a liquid insulator (oil) electrically from the conductive component and thus resulting in an exclusion of oil from the more highly stressed regions. The term "basically around" should be understood as that the conductive component is at least embedded to 50%, advantageously to at least 80% and most advantageously to at least 95% in the insulative moulding. A person skilled in the art may decide on the percentage according to the risk of the conductive component to come into contact with disturbing materials/effects. It may even suitable to embed the conductive component to 100% in the insulative moulding.

Advantageously, the insulative moulding is an elastomeric component providing the ability to adjust to operational conditions. Further, the insulative moulding has a material selected out of the group comprising of a polymer, a soft polymer (e.g. Polytetrafluoroethylene (PTFE)), a rubber and a silicone rubber. Hence, materials with known and good insulative as well as in part elastomeric properties can be used.

In a further embodiment of the invention the stress control device comprises at least one fastening structure. Consequently, the stress control device can be secured to/in the correct part of the connector unit. The fastening structure may be any component feasible for a person skilled in the art, like a ring, a clamp, a hook, a latch, a screw, a hole etc. According to a further aspect of the present invention, the stress control device is attached to the female part via the fastening structure. This provides a reliable and stable positioning of the stress control device especially during the mate of the male part and the female part.

According to another embodiment of the invention the conductive component and the insulative moulding are moulded onto the fastening structure. Thus, the fastening structure can be used to secure the elastomeric components. A reliable connection to the connector part or the female part, respectively, may be provided if the fastening structure has a material selected out of the group comprising of a metal, stainless steel and aluminium. In addition, by selecting a suitable metal as material for the fastening structure it provides the required electrical contact to the conductive component.

Hence, the stress control device is a component assembly or unit comprising at least the conductive component, the insulative moulding and the fastening structure. This component assembly fits tightly around the end of the conductive layer, excluding oil and providing a gradual taper of conductive material which allows the field to diverge smoothly, thus reducing the stresses and excluding the relative weak oil from the area.

Advantageously, the conductive component and the insulative moulding and the fastening structure of the stress control device are each embodied as a ring. Hence, all pieces can be easily integrated in the connector unit or advantageously at the female part, respectively. In a favoured realisation of the invention, the rings are arranged coaxially in respect to the axis of the connector unit and thus, in respect towards each other. Due to these embodiments the component assembly can be arranged or fitted easily in an axially extending bore of the female part. Moreover, the rings are adapted to correspond with a shape of the male part, especially with a conductor pin of the male part.

In an embodiment, the connector part is the female part, wherein the at least one stress control device comprises a first stress control device which is mounted in a bore of the female part. The first stress control device may have an annular shape allowing a pin of the male part to be inserted therethrough. The insulative mounding of the first stress control device may provide a radially outwardly facing surface which is in physical contact with an insulating sleeve of the female part. This way, a dielectric liquid filling the female part may be displaced from the insulating sleeve of the female part in the end portion of the conductive layer, thereby avoiding high electrical stresses inside the dielectric liquid and thus breakdown thereof.

In an embodiment, the connector part is the female part, wherein the at least one stress control device comprises a second stress control device which is mounted in a bore of the female part. The second stress control device has an annular shape allowing a pin of the male part to be inserted therethrough. The second stress control device may be shaped such that in the mated position, the insulative moulding is in physical contact with an outer surface of the pin of the male part. This way, a dielectric liquid filling the female part may be displaced from the end region of the conductive layer of the male part or pin, thereby avoiding high electrical stresses inside the dielectric liquid and thus breakdown thereof.

In an advantageously embodiment of the invention the stress control device includes a first stress control device and the end region includes a first end region of a first electrically conductive layer and further, the stress control device includes at least a second stress control device and the end region includes an at least second end region of at least a second electrically conductive layer. Hence, the risk of high electrical stress at at least two regions can be minimised resulting in an even more reliable connector unit. A dependable stress control may be obtained, when at each end region a stress control device is physically, especially electrically, connected to an electrically conductive layer.

Advantageously, the first electrically conductive layer is arranged at the female part and is connected to the high voltage part of the connector unit and the second electrically conductive layer is arranged at the male part and is connected to the zero voltage part of the connector unit. As a result, end regions of conductive layers which are in state of the art systems in contact with insulators, like oil, that have lower breakdown strength than solid insulators, can be protected against electrical stress by the stress control devices.

In a further realisation of the invention the first stress control device and the second stress control device each has a circular structure that is arranged coaxially in respect to the axis of the connector unit, thus allowing their advantageous arrangement in the connector unit. Advantageously, the first stress control device and the second stress control device are arranged in axial direction of the connector unit one after the other in the bore of the female part. Hence, the stress control devices are specifically arranged to engage in a mated position of the male part and the female part the end regions which are at risk to suffer high stress concentrations.

In a further advantageous realisation of the invention the first stress control device and the second stress control de-vice is connected in at least a mated position of the male part and the female part to the connector part via a press fit. As a result, both stress control devices connect their respective end region of the conductive layer tightly and securely. Advantageously, the first stress control device, which is arranged further away from the opening of the bore, is connected to the female part via a press fit and the second stress control device, which is arranged further towards an opening of the bore, is connected in a mated position of the male part and the female part to the male part via a press fit.

In other words, as the connector unit is assembled the first stress control device is press fitted into the female part and as the male part is mated to the female part the second stress control device is stretch fitted onto the male part. This ensures that the first stress control device is tightly arranged in the female bore and that the second stress control device contacts the second conductive layer of the male part securely and further that the male part is secured to the bore of the female part. Moreover, a further advantage of this is that the press fit as well as the stretch fit ensures that all of the insulation oil is excluded from the high stress region at the end regions of the platings.

Consequently, the second stress control device has a smaller inner diameter than an outer diameter of the male part. Furthermore, the inner diameter of the second stress control device is smaller than an inner diameter of the first stress control device. Hence, the first stress control device will never directly touch the male pin, since the inner diameter is large enough that there is clearance between these parts.

The first stress control device is connected to the high voltage part of the connector unit or the female part, respectively, at the forward end of the socket contact with its fastening structure. Before mating of the male part with the female part the second stress control device is mounted in the bore of the socket contact where an electrical contact is made between the 0V portion of the female socket and the aluminium fastening structure. This is made over an arrangement of components e.g. a spring, a spring plunger or another appropriate connection connecting the fastening structure to a metal component of the female part, wherein this component is in turn connected to a metal body of the female socket which is connected to earth.

According to an alternative embodiment and/or an additional feature of the invention the stress control device is embodied in such a way that it becomes conductive in dependency of an applied voltage. Or in other words, the stress control device comprises at least one electrically non-linear material. This allows the stress control device to react to loads outside an expected normal operating condition, which would act to reduce the field around unexpected contamination or damage to the connector part or its contact pin. This adaptive nature of the material properties would also help the connector unit under loading such as impulse voltage. A non-linear material has a relationship between applied voltage and resistivity which is not proportional. Once the voltage reaches threshold it changes from a resistive material to a conductive material.

Advantageously, the stress control device is embodied as a coating, especially out of the non-linear material. Thus, the stress control device can be easily applied. The coating may be an additional feature to the above described component assembly or the component assembly may be omitted and the coating is the sole stress control device. This would result in a simplification of the stress control within the connector unit design by removal of a number of difficult to mould components which must be positioned in an exact place relative to the receptacle pin features.

The coating may be easily obtained when the coating is applied by one of the following methods: over-moulding, powder coating, high velocity oxygen fuel spraying (HVOF) and plasma spraying. The over-moulding would e.g. be performed with a polymer filled with grains of a microvaristor compound (see below), the powder coating would e.g. be a coating process of a plastic filled with microvaristor compound grains, the high velocity oxygen fuel spraying (HVOF) and the plasma spraying would e.g. be a spraying of the microvaristor compound itself.

It is further provided, that the coating comprise at least one microvaristor and/or a plurality of microvaristors. Since this ceramic particle (s) become (s) conductive as higher electrical stresses are applied, the non-linear relationship between applied voltage and resistivity can be gained easily. Hence, the effect of such a coating is to grade the voltage by becoming conductive when placed under high electrical stress. The microvaristor may be any microvaristor feasible for a person skilled in the art, advantageously, the microvaristor is a Zinc oxide, like ZnO. Due to this selection, a material with a highly non-linear electric current to field relation may be used.

In a further embodiment it is provided, that the microvaris-tor and/or the plurality of microvaristors is added as (a) filler to a silicone rubber to produce an electrically nonlinear silicone. The filler may have a content of for example 40% vol. in the silicone matrix. This polymeric material may be applied by over-moulding or powder coating on the surface of the connector part, e.g. the conductor pin. This coating could be applied in addition to the existing conductive layer, especially at an end region to specifically control the field at the end of the conductive layer.

Alternatively, it may be possible to add the microvaristor and/or the plurality of microvaristors as (a) filler to a ceramic material e.g. $Bl_2O_3$, $MnO$, $Cr_2O_3$ or $Sb_2O_3$. This would be done by the coating process (e.g. HVOF, Plasma spraying) itself. This would result in a good durability of the coating.

According to a further aspect of the present invention the stress control device and/or the coating is connected to a surface and/or wherein the surface is a creepage surface when current is applied to the connector part. Due to this, it is possible to remove the requirement for external stress control features. In this context, a creepage surface is a surface along which there is an electrical field.

In an alternative embodiment of the invention the stress control device and/or the coating is formed integrally with the electrically conductive layer, thus pieces, costs and assembly efforts may be reduced. The term "formed integrally" should be understood that the stress control device and the conductive layer are represented or embodied by the same piece, layer or coating.

According to a further embodiment of the invention, a connector unit for use underwater or in a wet or severe environment is provided. The connector unit comprises a first connector part in form of a male part and a second connector part in form of a female part. At least one of the first connector part or the second connector part is configured as outlined above. In particular, the female part, and advantageously both parts are configured in accordance with any of the above described embodiments. Advantageously, the female part comprises the at least one, advantageously at least two stress control devices.

The above-described characteristics, features and advantages of this invention and the manner in which they are achieved are clear and clearly understood in connection with the following description of exemplary embodiments which are explained in connection with the drawings.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

FIG. 2: shows schematically a portion of the subsea connector unit from FIG. 1 in a mated position, FIG. 3: shows a front view of the first stress control device of FIG. 1, FIG. 4: shows a side view of the first stress control device of FIG. 3

FIG. 5 shows a section along line V-V through the first stress control device of FIG. 3, FIG. 6: shows a front view of the second stress control device of FIG. 1, FIG. 7: shows a side view of the second stress control device of FIG. 6

FIG. 8 shows a section along line VIII-VIII through the second stress control device of FIG. 6, FIG. 9 shows schematically a portion of the female socket from FIG. 1 with a recess, FIG. 10 shows a voltage profile of the mated connector unit for FIG. 2 and FIG. 11: shows a part of the connector unit in its mated position with an alternative embodiment of the stress control device.

DETAILED DESCRIPTION

Figure 1:
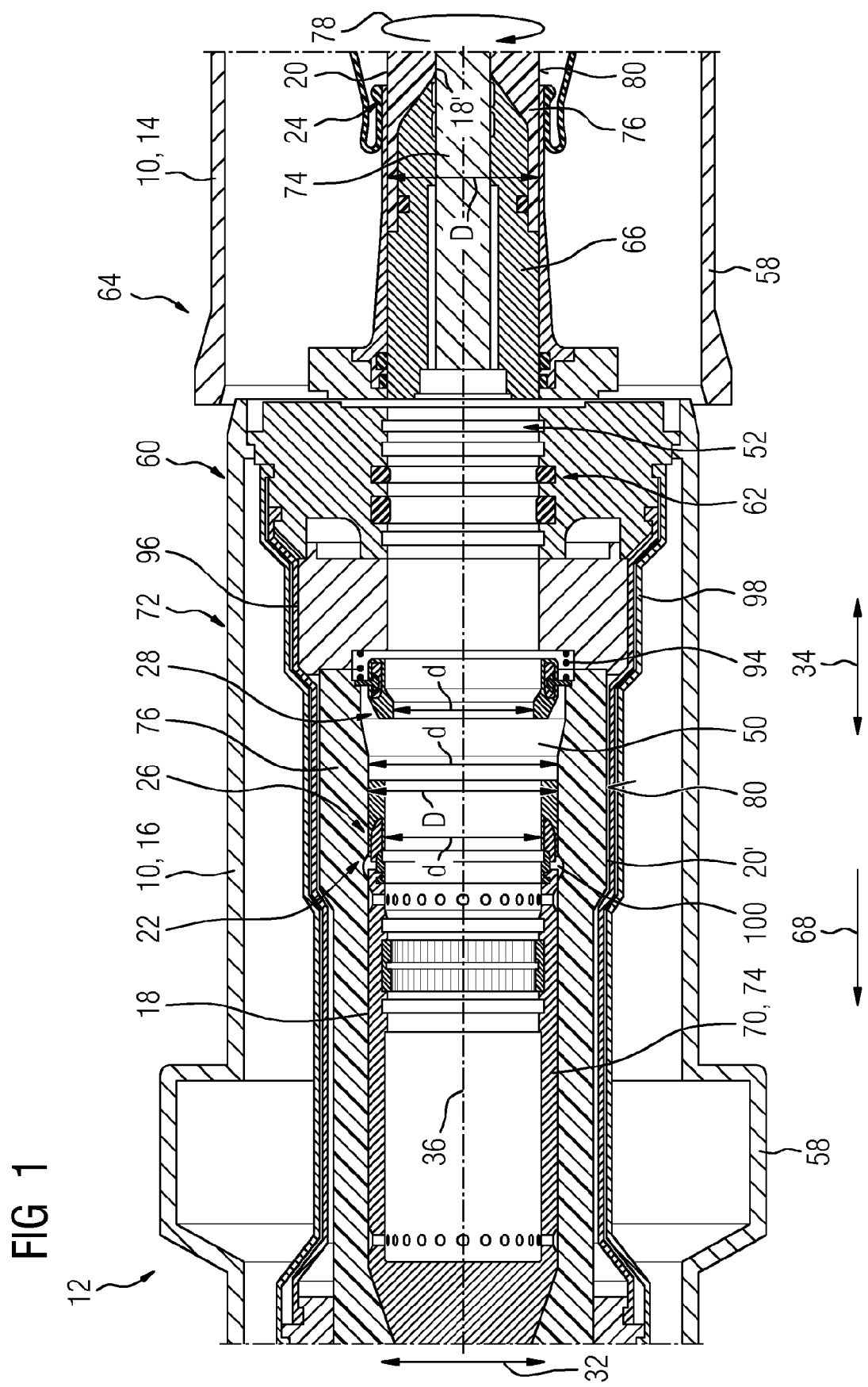
FIG. 1: shows schematically a subsea connector unit with an conductor pin and a female socket beforehand of mating and with two inventive stress control devices.

The illustrations in the drawings are schematically. It is noted that in different figures, similar or identical elements are provided with the same reference signs.

FIG. 1 shows an high voltage subsea connector unit 12 for connecting two connected parts, like two subsea cables (not shown), wherein the connector unit 12 comprises two inventive connector parts 10 in the form of a male part 14 or a conductor pin 14 and a female part 16 or female socket 16. Both the conductor pin 14 and the female socket 16 are each encased in a housing 58, which will be axially aligned during a mating or demating process of the male part 14 and female part 16. The female socket 16 is located at a plug front end 60 of one subsea cable and comprises an axially extending bore 50 with seals 62 for preventing entering of water and dirt into internals of the female part 16. The male part 14 is located at a receptacle front end 64 of the other subsea cable and comprises a receptacle pin assembly 66. Note that the connector parts 14, 16 may not only be used with cables, but may also be mounted to a bulkhead or the used on a stabplate or the like.

For a mating of the male part 14 and female part 16 the bore 50 and the receptacle pin assembly 66 will be arranged axially aligned towards each other, so that by moving the receptacle pin assembly 66 in direction of the female part 16 or the moving direction 68, the receptacle pin assembly 66 can partially enter the bore 50 of the female part 16. Due to a proper positioning of the receptacle pin assembly 66 in the bore 50 of the female part 16 an electrical connection is established between the male part 14 and a socket contact 70 of the female part 16. This mating position is schematically shown in FIG. 2, which depicts a portion of the subsea connector unit 12 at a front end 72 of the socket contact 70.

The male part 14 and the female part 16 each comprise a current carrying component 74 in the form of a conductive core in the case of the male part 14 and the socket contact 70 in the case of the female part 16. The current carrying component 74 may be made out of copper. Moreover, both comprise an insulating sleeve 76 made out of, for example, insulative polyether ether ketone (PEEK), in circumferential direction 78 around the current carrying component 74. Arranged between the current carrying component 74 and the insulating sleeve 76 both parts 14, 16 comprise a first electrically conductive layer 18, 18' that is connected to a high voltage part of the connector unit 12. The current carrying component 74 of the male part 14 and the female part 16 are configured to trans-port electrical power at high voltage, e.g. at a voltage level between about 1.000 V AC and 100.000 V AC, in particular between about 10.000 V AC and 80.000 V AC. The connector unit may also be operable at corresponding DC voltage levels.

Furthermore, the male part 14 and the female part 16 comprise a second conductive layer 20, 20' that is arranged at an outer surface 80 of the respective insulating sleeve 76. The second conductive layer 20, 20' is connected to a earth connection or a zero voltage (0V) part of the connector unit 12. The second conductive layer 20, 20' may provide an earth screen.

The conductive layers 18, 18', 20, 20' may for example be metal layers, they may be made out of e.g. titanium or high phosphorous nickel on top of a copper base layer. Generally, it would be also possible to provide a ceramic layer or a conductive plastic layer as conductive layer (s) 18, 18', 20, 20'. Further, in case of the conductive layers 18, 18', 20, 20' implemented as metal layers, they may have a thickness between 1 μm to 30 μm and advantageously of about 25 μm. In case of a ceramic layer the conductive layers 18, 18', 20, 20' may have a thickness of about 100 μm. A conductive plastic layer would have a thickness of about 2 mm to 5 mm (not shown).

The first conductive layer 18 at the female socket 16 and the second conductive layer 20 at the conductor pin 14 create during operation regions of high electrical stress wherever the layer 18, 20 ends which cause stress concentrations.

These regions of the conductive layers 18, 20 are named in the following text first end region 22 (end of layer 18 at the female socket 16) and second end region 24 (end of layer 20 at the conductor pin 14). Thus, these end regions 22, 24 are being electrically stressed after a mating of the male part 14 and the female part 16.

To reduce or minimise the stress concentrations at these end regions 22, 24 the connector parts 10 comprise stress control devices 26, 28 that are at least in the mated position of the male part 14 and the female part 16 physically and electrically connected to one of the electrically conductive layers 18, 20 via the end regions 22, 24. Specifically, a first stress control device 26 is connected to the end region 22 of conductive layer 18 of the female socket 16 (first end region 22 of the first conductive layer 18) and is thus connected to the high voltage part of the connector unit 12. A second stress control device 28 is connected to the end region 24 of conductive layer 20 of the male pin 14 (second end region 24 of the second conductive layer 20) and is thus connected to the zero voltage part of the connector unit 12 via several intermediate components 94, 96, 98 (see below).

The first stress control device 26 is shown in FIGS. 3 to 5 and the second stress control device 28 is shown in FIGS. 6 to 8, wherein FIGS. 3 and 6 show a front view of the respective stress control device 26, 28, FIGS. 4 and 7 a side view of the respective stress control device 26, 28 and FIGS. 5 and 8 a section along line V-V or VIII-VIII, respectively, of the respective stress control device 26, 28 of FIG. 3 or 6.

Each stress control device 26, 28 comprises a component assembly 82 with a conductive component 38 out of a conductive resilient material, in particular conductive silicone rubber, an insulative moulding 40 out of an insulative resilient material, in particular insulative silicone rubber and a fastening structure 42 out of aluminium (see FIGS. 5 and 8). The insulative moulding 40 is moulded basically around the conductive component 38. Specifically, the conductive component 38 of the first stress control device 26 has an open side section 84 that extends in radial direction 32 of the stress control device 26 and is oriented towards the female socket 70 in an assembled state of the female part 16.

The conductive component 38 of the second stress control device 28 is fully embedded in the insulative moulding 40 (with exception of a portion where the fastening structure 42 passes through the insulative moulding 40). Thus, the insulative moulding 40 separates in an assembled state of the connector unit 12 the conductive component 38 from a dielectric liquid, such as insulating oil 86 filling the bore 50.

In case of both stress control devices 26, 28 the conductive components 38 and the insulative mouldings 40 are moulded onto the respective fastening (or supporting-) structure 42. First the conductive component 38 is moulded onto the fasten-ing structure 42 and thereafter the insulative moulding 40 is moulded onto the conductive component 38, thus the insulative moulding 40 is connected to the fastening structure 42 via the conductive component 38.

The fastening structure 42 of the first stress control device 26 extends from the side section 84 of the conductive component 38 in axial direction 34 or basically perpendicular with respect to the radial direction 32 of the first stress control device 26. Moreover, the fastening structure 42 of the first stress control device 26 has a groove 88 extending in circumferential direction 78 of the fastening structure 42 and facing in an assembled state radially towards the socket contact 70 to connect the first stress control device 26 to the socket contact 70 (see FIGS. 1 and 5).

Further, the fastening structure 42 of the second stress control device 28 extends from a planar radially outer side 90 of the conductive component 38 in radial direction 32 of the second stress control device 28 and projects in an assembled state towards the sleeve 76 of the female part 16.

Furthermore, the fastening structure 42 of the second stress control device 28 has a plurality of apertures 92, which extend in circumferential direction 78, and are used to connect the second stress control device 28 to the insulating sleeve 76 of the female socket 16 (see FIGS. 1 and 8). This connection is facilitated via a mediator 94, like a spring (not shown), that connects the fastening structure 42 to a metal component 96 of the female socket 16. This component 96 is in turn connected to a metal body 98 of the female socket 16 which is connected to earth (0V).

Thus, the fastening structures 42 can be used to secure and support the elastomeric components (conductive component 38, insulative moulding 40). Or in other words, the stress control devices 26, 28 are mounted or attached to the female part 16 via the respective fastening structure 42.

The conductive component 38, the insulative moulding 40 and the fastening structure 42 are all embodied as a ring 48. Hence, the first stress control device 26 and the second stress control device 28 each has a circular structure 48 (i.e. they have an annular shape). In the assembled state of the female part 14 the rings 48 or the circular structure 48 are/is arranged coaxially in respect to the axis 36 of the connector unit 12 (see FIG. 1).

The first stress control device 26 and the second stress control device 28 are arranged in axial direction 34 of the connector unit 12 one after the other in the bore 50 of the female part 16. Specifically, the first stress control device 26 is arranged at the front end 72 of the socket contact 70 and the second stress control device 28 is arranged further towards an opening 52 of the bore 50 of the female part 16.

The second stress control device 28 has an inner diameter d that is (slightly) smaller than an outer diameter D of the conductor pin 14. Hence, in a mated position of the male part 14 and the female part 16, the second stress control device 28 is in physical contact with an outer surface of the pin assembly 66, it may be regarded to be connected to the male part 14 via a 'press fit' (see FIG. 1). The fit is such that it allows insertion/removal of the male part into/from the female part of the connector unit without application of excessive force. In the mated position, dielectric liquid is thus displaced from the end region 24 where the conductive layer 20 ends on the insulating sleeve 76 of pin assembly 66, thus avoiding high electrical stresses in and breakdown of the dielectric liquid.

Moreover, the inner diameter d of the second stress control device 28 is smaller than an inner diameter d of the first stress control device 26. Thus, the first stress control device 26 is arranged with a clearance with respect to the male pin 14 (i.e. an annular space may be present between the first stress control device 26 and the pin assembly 66 in the mated state). Further, an outer diameter D of the stress control device 26 is larger than an inner diameter d of the insulating sleeve 76 of the female socket 16. Therefore, the first stress control device 26 has to be pressed into the socket insulating sleeve 76 during assembly (i.e. it may be mounted therein with a press fit). These press fits will ensure that the insulation oil 86 is excluded from the high stress region around the end regions 22, 24 of the conductive layers 18, 20.

There is also a rounded radial recess 100 within the insulating sleeve 76 of the female socket 16. A surface of the recess 100 is plated (part of the first conductive layer 18) and it has a protrusion 102 or nose, which extends in axial direction 34 away from the first stress control device 26 and which extends further over the end region 22 of the first conductive layer 18. The function of this recess 100 is that the end region 22 of the first conductive layer 18 can be hidden under the protrusion 102, thus further reducing the stress at the end region 22 of the first conductive layer 18 (see FIG. 9).

To minimise an occurrence of high stress concentrations at the end regions 22, 24 the conductive components 38 of the stress control devices 26, 28 have a specifically shaped contour 44. This contour 44 is a tapered contour 44 or a rounded cone 44, respectively, wherein the gradual and conical taper 46 is extending away from the respective end region 22, 24 of the respective electrically conductive layer 18, 20 (see FIGS. 1 and 2). During operation of the connector unit 12 in its mated position, a voltage increases through the various insulation media between the high voltage and 0V regions.

Due to the provided gradual conical taper 46 of the conductive component 38 and its selected orientation the stress control devices 26, 28 are embodied in such a way that regions 30, 30', 30'', 30''' with different potentials, which are established between the respective first conductive layer 18, 18' and the respective second conductive layer 20, 20' in a mated position of the male part 14 and the female part 16, are distributed (substantially) homogeneously in radial direction 32 and in axial direction 34 in respect of the axis 36 of the connector unit 12. The conductive component 38 al-lows the field to diverge smoothly, thus reducing the stresses. This is depicted in FIG. 10 in which four regions 30, 30', 30'', 30''' are exemplarily shown and in which the stress control devices 26, 28 are shown in dashed lines and the other parts are only depicted by their outlines for clarity.

In particular, the first and second stress control devices 26, 28, in particular their respective conductive component 38, are arranged and shaped so as to reduce the condensing of equipotential field lines of the electrical field (electrical stress concentrations) in the respective end regions 22, 24.

Generally, it would also be possible that one of the stress control devices or both may comprise at least one electrically non-linear material (not shown). This allows the stress control device to react to loads outside an expected normal operating condition, which would act to reduce the field around unexpected contamination or damage to the connector part or its contact pin. This adaptive nature of the material properties would also help the connector unit under loading such as impulse voltage.

Figure 11:
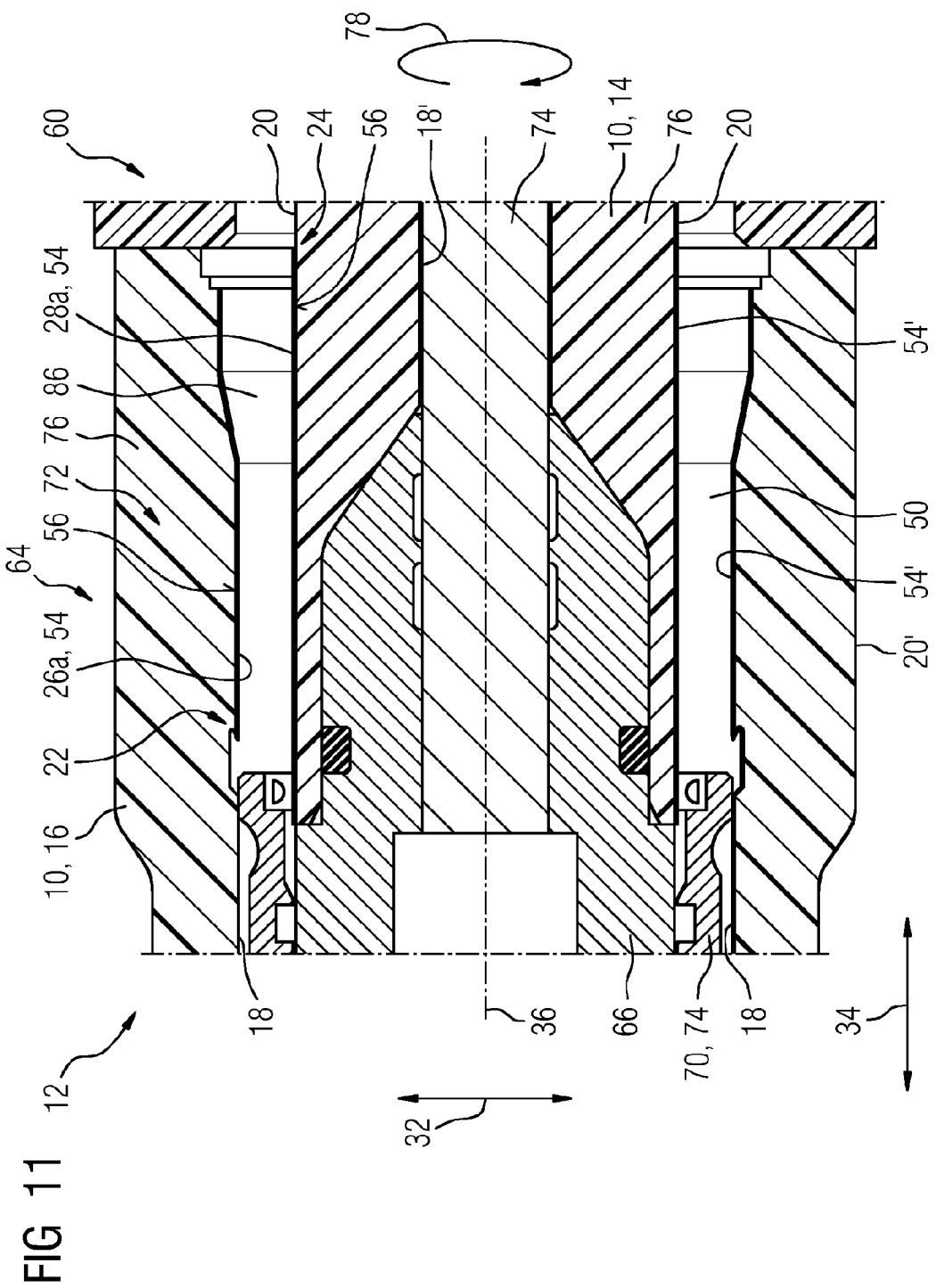

In FIG. 11, an alternative exemplary embodiment of the stress control device 26, 28 is shown. Identical components, features and functions are denoted by the same reference numerals. However, to distinguish the exemplary embodiment of FIG. 11 over that of FIGS. 1 to 10 the letter 'a' has been added to the reference numerals of the components that are designed differently in the exemplary embodiment of FIG. 11. The description below is substantially limited to these differences compared to the exemplary embodiment of FIGS. 1 to 10, wherein reference is made to the description of the exemplary embodiment in FIGS. 1 to 10 with respect to identical components, features, and functions.

FIG. 11 shows an alternative embodiment of the stress control device 26, 28. The stress control device 26a, 28a of FIG. 11 differs from the stress control device 26, 28 of FIGS. 1 to 10 in that it is embodied as a coating 54, 54' out of a nonlinear material or at least which comprises a non-linear material.

In FIG. 11 a portion of a subsea connector unit 12 in its mated position is shown. An unmated position is analogously embodied as shown in FIG. 1 without the component assembly 82 of the stress control devices 26, 28.

The connector unit 12 comprises two connector parts 10 in the form of a male part 14 and a female part 16. The female socket 16 is located at a plug front end 60 of a first not shown subsea cable and comprises an axially extending bore 50 with not shown seals for preventing entering of water and dirt into internals of the female part 16. The male part 14 is located at a receptacle front end 64 of a second not shown subsea cable and comprises a receptacle pin assembly 66. During a mating of the male part 14 and female part 16 the receptacle pin assembly 66 partially enters the bore 50 of the female part 16. Due to a proper positioning of the receptacle pin assembly 66 in the bore 50 of the female part 16 an electrical connection is established between the male part 14 and a socket contact 70 of the female part 16. This mating position is schematically shown in FIG. 11.

The male part 14 and the female part 16 each comprise a current carrying component 74 and an insulating sleeve 76 extending in circumferential direction 78 around the current carrying component 74. Arranged between the current carrying component 74 and the insulating sleeve 76 both parts 14, 16 comprise a first electrically conductive layer 18, 18' that is connected to a high voltage part of the connector unit 12. Furthermore, the male part 14 and the female part 16 comprise a second conductive layer 20, 20' that is arranged at an outer surface 80 of the respective insulating sleeve 76. The second conductive layer 20, 20' is connected to a zero voltage (0V) part of the connector unit 12.

The first conductive layer 18 at the female socket 16 and the second conductive layer 20 at the conductor pin 14 create during operation regions of high electrical stress wherever the plating ends which cause stress concentrations. These regions of the conductive layers 18, 20 are named in the following text first end region 22 (layer 18 at female socket 16) and second end region 24 (layer 20 at conductor pin 14). Thus, these end regions 22, 24 are being electrically stressed after a mating process of the male part 14 and the female part 16.

To reduce or minimise the stress concentrations at these end regions 22, 24 the connector parts 10 comprise stress control devices 26a, 28a that are at least in the mated position of the male part 14 and the female part 16 physically and electrically connected to one of the electrically conductive layers 18, 20 via the end regions 22, 24. Specifically, a first stress control device 26a is connected to the end region 22 of conductive layer 18 of the female socket 16 (first end region 22 of the first conductive layer 18) and is thus connected to the high voltage part of the connector unit 12 and a second stress control device 28a is connected to the end region 24 of conductive layer 20 of the male pin 14 (second end region 24 of the second conductive layer 20) and is thus connected to the zero voltage part of the connector unit 12. Moreover, each stress control device 26a, 28a is connected to a surface 56 that is a creepage surface 56 when current is applied to the connector part 10. Specifically, the coating is applied on the creepage surface 56. According to this embodiment the conductive layers 18, 20 and the stress control devices 26a, 28a are embodied as separate pieces from each other (see upper half of FIG. 11).

Both stress control devices 26a, 28a are embodied as a coat-ing 54. The stress control devices 26a, 28a or the coating 54 comprises an electrically non-linear material in the form of a plurality of microvaristors, wherein the microvaristor is Zinc oxide (ZnO). The coatings 54 are exemplarily shown in the upper half of FIG. 11 as enhanced, thick line for better presentability and are not drawn to scale. In general, the coating 54 is at least arranged/applied in such a scale to reduce electrical stresses of the connector unit 12. To which surfaces and the required scale of the coating 54 will be decided from a person skilled in the art according to its knowledge in the field.

Thus, if high electrical stresses occur at the coatings 54 the microvaristor particles become conductive. Hence, the effect of such a coating 54 is to grade the voltage by becoming conductive when placed under high electrical stress. Due to an such embodied stress control device 26a, 28a, regions with different potentials being established between the respective first electrically conductive layer 18, 18' and the respective second electrically conductive layer 20, 20' in a mated position of the male part 14 and the female part 16 are distributed homogeneously in radial direction 32 and in axial direction 34 in respect of an axis 36 of the connector unit 12 (not shown, but analogous to the depiction in FIG. 10).

The stress control devices 26a, 28a may be applied to the connector part 10 in several ways.

A first possibility would be by compounding a polymeric material with Zinc oxide microvaristor filler. This polymeric material could then be applied by overmoulding or powder coating on a surface (creepage surface 56) of the connector part e.g. the conductor pin 14. This coating 54 could be applied in addition to the existing conductive layer 18, 20, to specifically control the field at the end regions 22, 24 of the plating.

A second possibility is that the coating could be applied along a whole axial length of the connector part, e.g. the conductor pin (not shown). This would be easier to manufacture in comparison to the aforementioned coating technique.

A third possibility is using coating techniques typically utilised for ceramic materials (e.g. high velocity oxygen fuel spraying (HVOF) or plasma spraying) to apply the coating. The process parameters of this technique will be modified and applied in such a way, that either the microvaristor structure is preserved or a macrovaristor is created during the application process. To create a macrovaristor, the Zinc oxide and additive ceramics (e.g. $Bi_2O_3$, MnO, $Sb_2O_3$) must be processed in such a way as to create a varistor structure along either the creepage length or the entire surface of the connector part (not shown).

Additionally or alternatively, it would be possible that at least one stress control device 26a, 28a is formed integrally with at least one of the electrically conductive layers 18, 20. Thus, (a) coating (s) 54' would be conductive to a first degree under normal conditions and would become conductive to a higher degree once the voltage reaches a threshold of the embedded non-linear material. The coatings 54' are exemplarily shown in the lower half of FIG. 11 as enhanced, thick line for better presentability and are not drawn to scale.

In general, it would be also feasible to combine at least one component assembly 82 described in the embodiment of FIGS. 1 to 10 with a coating 54, 54' from the embodiment described in FIG. 11. For example, it would be possible to use a conductive layer 18, 20 or coating 54' comprising a non-linear material according to the second embodiment of the invention described in FIG. 11 in combination with the component assembly 82 from FIGS. 1 to 10 (not shown).

It should be noted that the term "comprising" does not exclude other elements or steps and "a" or "an" does not ex-elude a plurality. Also elements described in association with different embodiments may be combined. It should also be noted that reference signs in the claims should not be construed as limiting the scope of the claims.

Although the invention is illustrated and described in detail by the preferred embodiments, the invention is not limited by the examples disclosed, and other variations can be derived therefrom by a person skilled in the art without departing from the scope of the invention.

The invention claimed is:

1. A connector unit for use underwater or in a wet or severe environment, comprising
a first connector part in form of a male part comprising a conductor pin and a second connector part in form of a female part comprising a current carrying component configured to be in electrical contact with the conductor pin after a mating process of the male part and the female part,
the female part comprising at least one electrically conductive layer comprising at least one end region being electrically stressed after the mating process, the female part further comprising at least one stress control device for reducing electrical stress at the at least one end region,
wherein the at least one stress control device comprises a first stress control device comprising a first device conductive component, a first device insulative moulding, and a first device fastening structure in electrical communication with the first device conductive component and with a high voltage part of the connector unit, wherein the first stress control device is mounted in a bore of the female part via the first device fastening structure,
wherein the first stress control device comprises an annular shape allowing the conductor pin of the male part to be inserted therethrough,
wherein the first device insulative moulding provides a radially outwardly facing surface which is in physical contact with an insulating sleeve of the female part.

2. The connector unit according to claim 1,
wherein the at least one electrically conductive layer comprises a first electrically conductive layer that is connected to the high voltage part of the connector unit and at least one second electrically conductive layer that is connected to an earth connection or a zero voltage part of the connector unit.

3. The connector unit according to claim 2,
wherein the female part comprises the insulating sleeve around the current carrying component, wherein at least a part of the first electrically conductive layer is provided on the inside of the insulating sleeve and wherein at least a part of the at least one second electrically conductive layer is provided on the outside of the insulating sleeve.

4. The connector unit according to claim 1,
wherein the first stress control device is arranged at least in a mated position of the male part and the female part with physical contact with the at least one end region of the at least one electrically conductive layer.

5. The connector unit according to claim 1,
wherein the at least one stress control device comprises a second stress control device comprising a second device conductive component at least partly encased in a second device insulative moulding, and a second device fastening structure in electrical communication with the second device conductive component and with an earth connection or a zero voltage part of the connector unit, and wherein the second stress control device is mounted in the bore of the female part via the second device fastening structure,
wherein the second stress control device comprises an annular shape allowing the conductor pin of the male part to be inserted therethrough, the second stress control device being shaped such that in a mated position, the second device insulative moulding is in physical contact with an outer surface of the conductor pin of the male part.

6. The connector unit according to claim 1,
wherein the first device conductive component comprises a material selected out of the group comprising of a metal, a polymer, an elastomer, a rubber and a silicone rubber and/or
wherein the first device insulative moulding comprises a material selected out of the group comprising of a polymer, a soft polymer, a rubber and a silicone rubber and/or
wherein the first device fastening structure comprises a material selected out of the group comprising of a metal, stainless steel and aluminium.

7. The connector unit according to claim 1,
wherein the first device conductive component comprises a tapered contour comprising a taper that extends away from the at least one end region of the at least one electrically conductive layer.

8. The connector unit according to claim 1,
wherein the first device conductive component is partly or completely encased by the first device insulative moulding.

9. The connector unit according to claim 1,
wherein the first device conductive component and the first device insulative moulding and the first device fastening structure of the first stress control device are each embodied as a ring.

10. The connector unit according to claim 1,
wherein the at least one end region comprises a first end region of a first electrically conductive layer, and
wherein the at least one stress control device further comprises at least one second stress control device and the at least one end region further comprises a second end region of at least one second electrically conductive layer.

11. The connector unit according to claim 10,
wherein at each end region a respective stress control device is physically connected to a respective electrically conductive layer.

12. The connector unit according to claim 10,
wherein the first electrically conductive layer is arranged at the female part and is connected to the high voltage part of the connector unit and the at least one second electrically conductive layer is arranged at the male part and is connected to a zero voltage part of the connector unit.

13. The connector unit according to claim 10,
wherein the first stress control device and the at least one second stress control device are arranged in axial direction of the connector unit one after the other in the bore of the female part.

14. The connector unit according to claim 10,
wherein the at least one second stress control device comprises at least one electrically non-linear material.

15. The connector unit according to claim 14,
wherein the at least one second stress control device comprises a coating.

16. The connector unit according to claim 15,
wherein the coating comprises at least one microvaristor comprising zinc oxide.

17. The connector unit according to claim 4,
wherein the physical contact comprises an electrical contact to the at least one end region of the at least one electrically conductive layer.

18. The connector unit according to claim 7,
wherein the tapered contour comprises a rounded cone.

19. The connector unit according to claim 9,
wherein the rings are arranged coaxially with respect to a longitudinal axis of the connector unit.

20. The connector unit according to claim 11,
wherein at each end region the respective stress control device is electrically connected to the respective electrically conductive layer.

* * * * *